(12) United States Patent
Ensher et al.

(10) Patent No.: US 11,448,593 B1
(45) Date of Patent: Sep. 20, 2022

(54) METHOD OF SPECTROSCOPICALLY CHARACTERIZING A SURFACE

(71) Applicant: Insight Photonic Solutions, Inc., Lafayette, CO (US)

(72) Inventors: Jason Ensher, Lafayette, CO (US); Christopher Wood, Lafayette, CO (US)

(73) Assignee: INSIGHT PHOTONIC SOLUTIONS, INC., Lafayette, CO (US)

( * ) Notice: Subject to any disclaimer, the term of this patent is extended or adjusted under 35 U.S.C. 154(b) by 289 days.

(21) Appl. No.: 16/809,163

(22) Filed: Mar. 4, 2020

Related U.S. Application Data

(60) Provisional application No. 62/813,861, filed on Mar. 5, 2019.

(51) Int. Cl.
*G01N 21/359* (2014.01)
*G01N 21/31* (2006.01)
*G01J 3/10* (2006.01)
*G01N 21/39* (2006.01)
*G01J 3/45* (2006.01)

(52) U.S. Cl.
CPC ............. *G01N 21/359* (2013.01); *G01J 3/10* (2013.01); *G01N 21/314* (2013.01); *G01N 21/39* (2013.01); *G01J 3/45* (2013.01); *G01J 2003/106* (2013.01)

(58) Field of Classification Search
CPC .... G01N 21/359; G01N 21/314; G01N 21/39; G01J 3/10; G01J 3/45; G01J 2003/106
See application file for complete search history.

(56) References Cited

U.S. PATENT DOCUMENTS 8,873,066 B2 * 10/2014 Ensher ............... G01B 9/02005
356/497
2005/0167593 A1 8/2005 Forsyth

OTHER PUBLICATIONS

U. Morgner, et al., Spectroscopic Optical Coherence Tomography, Optics Letters, Jan. 15, 2000, vol. 25, No. 2.

* cited by examiner

*Primary Examiner* — Christine S. Kim

(57) ABSTRACT

A device and method for performing reflectivity measurements at a distance by receiving two or more reflected signals (using two or more different wavelength sweeps) and calculating ratios of the two (or more) received reflected signals, for the purpose of determining the composition of a material or surface at a distance.

26 Claims, 6 Drawing Sheets

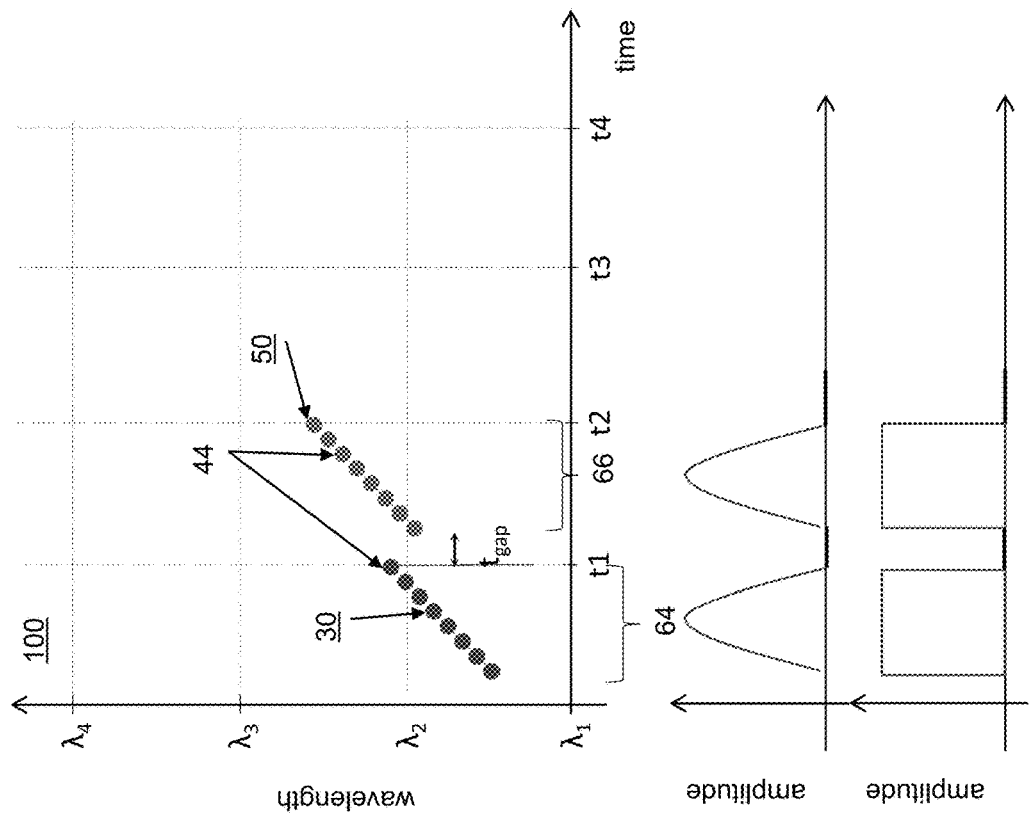
FIG. 8
FIG. 9
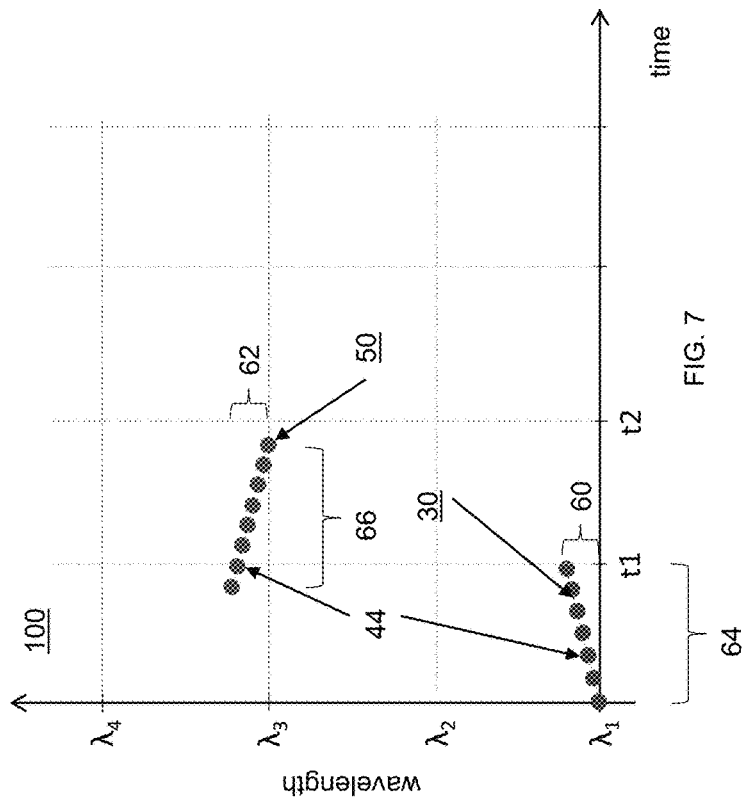
FIG. 7

METHOD OF SPECTROSCOPICALLY CHARACTERIZING A SURFACE

RELATED APPLICATIONS

This application claims the benefit of U.S. 62/813,861 filed on Mar. 5, 2019. Which is herein incorporated by reference in its entirety.

TECHNICAL FIELD

The present disclosure relates generally to optical devices and more particularly to performing spectroscopic characterization of a surface.

BACKGROUND

In a variety of applications, it can be very important to measure the composition of a surface or a volume at a distance. For example, on aircraft, it can be critically important to detect the difference between ice and water on a wing or fuselage. For a ground-based vehicle, such as a car or even a drone, it may be useful to detect what is on the road far enough in advance to enable the car to adjust to conditions or to warn a driver of approaching driving conditions. In processes like combustion plants or chemical reaction chambers, it can be important to detect what chemicals are present at a remote distance. The range of stand-off distances could be as small as centimeters or as large as 10-200 meters.

A number of techniques have emerged to characterize a surface or volume at a distance. Many such techniques use spectroscopy. For example, it is standard practice in chemistry to interrogate a sample in the lab and measure its spectrum using FTIR (Fourier Transform Infrared) spectroscopy. FTIR is very sensitive, but the measurements are generally very slow and limited by needing to move a mirror in an interferometer. FTIR spectrometers are also generally limited to the lab due to their size and cost.

Outside of the lab, highly sensitive techniques for spectroscopy have emerged. In medical applications, over distances of 1-3 millimeters and over spectral regions of 100-300 nm, the technique of Spectroscopic Optical Coherence Tomography (S-OCT) was developed to extract the spectrum using a Fourier analysis of the interferometric data measured via OCT. Unfortunately, this technique is impractical over distances beyond a few centimeters, because the period of the interferometric signals is smaller than the spectral resolution of a practical spectrometer. Alternatively, S-OCT could be performed with a swept-wavelength light source like a laser, but again it is impractical to measure a broad wavelength spectrum for a target at a distance, because the signal frequencies generated by the interferometer quickly become so high (GHz or beyond), that the bandwidth of electronics become impractically expensive to implement. As an example, consider a 100 nm sweep centered at 1310 nm and swept with a repetition rate of 100 kHz (10 μsec sweep time at 100% duty cycle). For a target at 2 mm distance the interferometer signal frequency is 23 MHz, which is practical and cost effective to measure electrically. At a distance of 20 m, however, the interferometer signal is 230 GHz, which is very difficult to measure electrically and requires expensive components.

An alternative approach to measuring the spectroscopic signature of a surface at a distance is to measure the spectrum in reflection. It may be feasible to create a sensitive and discriminating signature of the surface with only 2-3 relatively narrow wavelength regions. For example, as shown in FIG. 1 from US 2005/0167593, techniques exist in which three light sources in the near infrared are used to create a simple metric of the ratios of reflectivity in each wavelength band 10-50 nm wide. The implication is that through integrating the signal in these few bands, enough signal may be measured by normalizing the reflectivity signals and taking ratios, variations in ambient light or source intensity may be eliminated. These methods may be limited in that if enough background light is present, it may saturate the detectors and ratios of signal will be inaccurate. Also, the amount of light reflected may be too small to measure the signal over the noise. This may be especially true over a large distance because the amount of collected light may be small. Recent developments in avalanche photodiodes or single photon avalanche photodiodes (SPADs) can provide tremendous amplification and sensitivity, but at the potential risk of detector saturation and then finite refractory time to recover good measurements.

SUMMARY

There's a need for a spectroscopic technique with high sensitivity at a distance that is immune to background light levels and provides signal in one, two or multiple spectroscopic regions.

The present invention solves the problem of providing a highly sensitive rapid means to perform spectroscopic characterization of a surface or sample at large distances. The method and device described herein may be useful in Stand-off detection, process monitoring, automobiles, aircraft, Frequency-modulated continuous-wave (FMCW) LiDAR, OCT, OFDR, OFDI, spectroscopy, and related technologies.

The present disclosure provides a device and method for performing measurements at a distance of returning electromagnetic radiation by receiving two reflected signals (using two different wavelength sweeps) and calculating a ratio of the two received reflected signals.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

FIG. 7 shows two exemplary sweeps overlapping partially in time.

FIG. 8 shows another two exemplary sweeps separated in time by a time gap.

FIG. 9 shows one potential shaped amplitude of the sweeps of FIG. 8.

DETAILED DESCRIPTION

Figure 1:
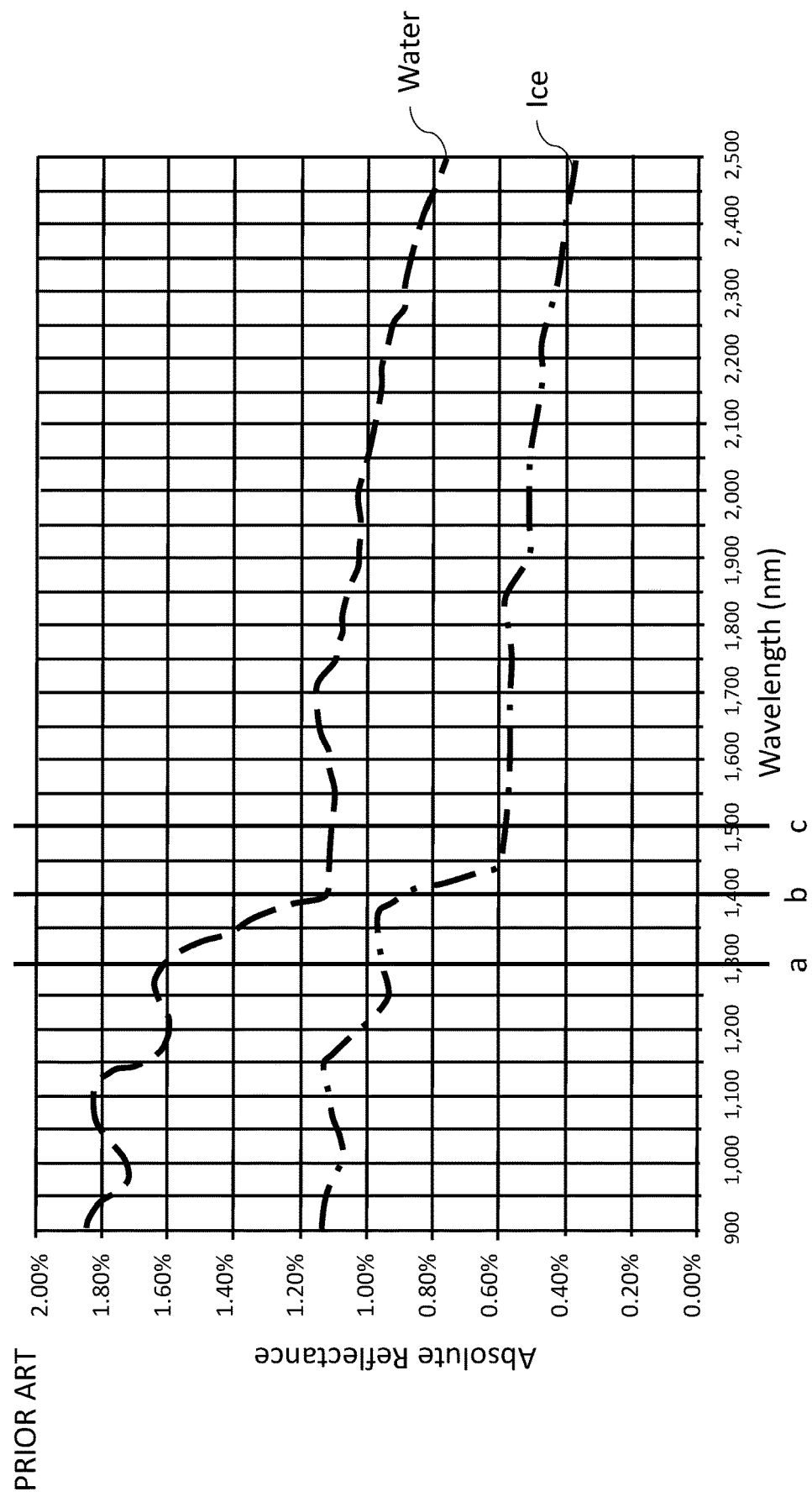
FIG. 1 is a figure from the prior art showing the absolute reflectance of water and ice at different wavelengths.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

Reflectivity of a target depends on the surface shape or volume composition of the target, as well as the spectral response of the material that the target is made of. If the same target material is illuminated with different wavelengths of light, the measured reflectivity may vary, because reflectivity depends on the wavelengths of light used during illumination. In this way, the present invention measures spectroscopic qualities of a target at a distance. FMCW LiDAR, OCT (Optical Coherence Tomography), OFDR (Optical Frequency Domain Reflectometry) or OFDI (Optical Frequency Domain Interferometry) are all the same technique for interferometrically measuring reflectivity with substantially enhanced sensitivity over direct detection methods.

"Reflectivity" measurements described herein may refer to all signal returning from an object. That is, the reflectivity measurement is not limited to electromagnetic radiation reflected at a surface of an object, but may also refer to electromagnetic radiation that interacted with structures below the surface (e.g., in the first few mm from the surface) and that was reflected or scattered. Also, the amount of scatter and loss in the material of the target may be wavelength dependent. This scatter and loss may reduce the returning signal in a wavelength dependent way.

The present disclosure provides a device and method for performing reflectivity measurements at a distance by emitting two (or more) different electromagnetic radiation sweeps that interact with an object. During the sweeps of the electromagnetic radiation, the optical wavelength may be swept at two or more different center wavelengths with two or more different sweep rates and two or more different optical amplitude vs. time profiles. Two (or more) returning signals are received and differences between both the returning signals and the corresponding emitted signals are compared using interferometry. A reflectivity of the object is determined by comparing a ratio of the two (or more) interferometric signals.

Figure 2:
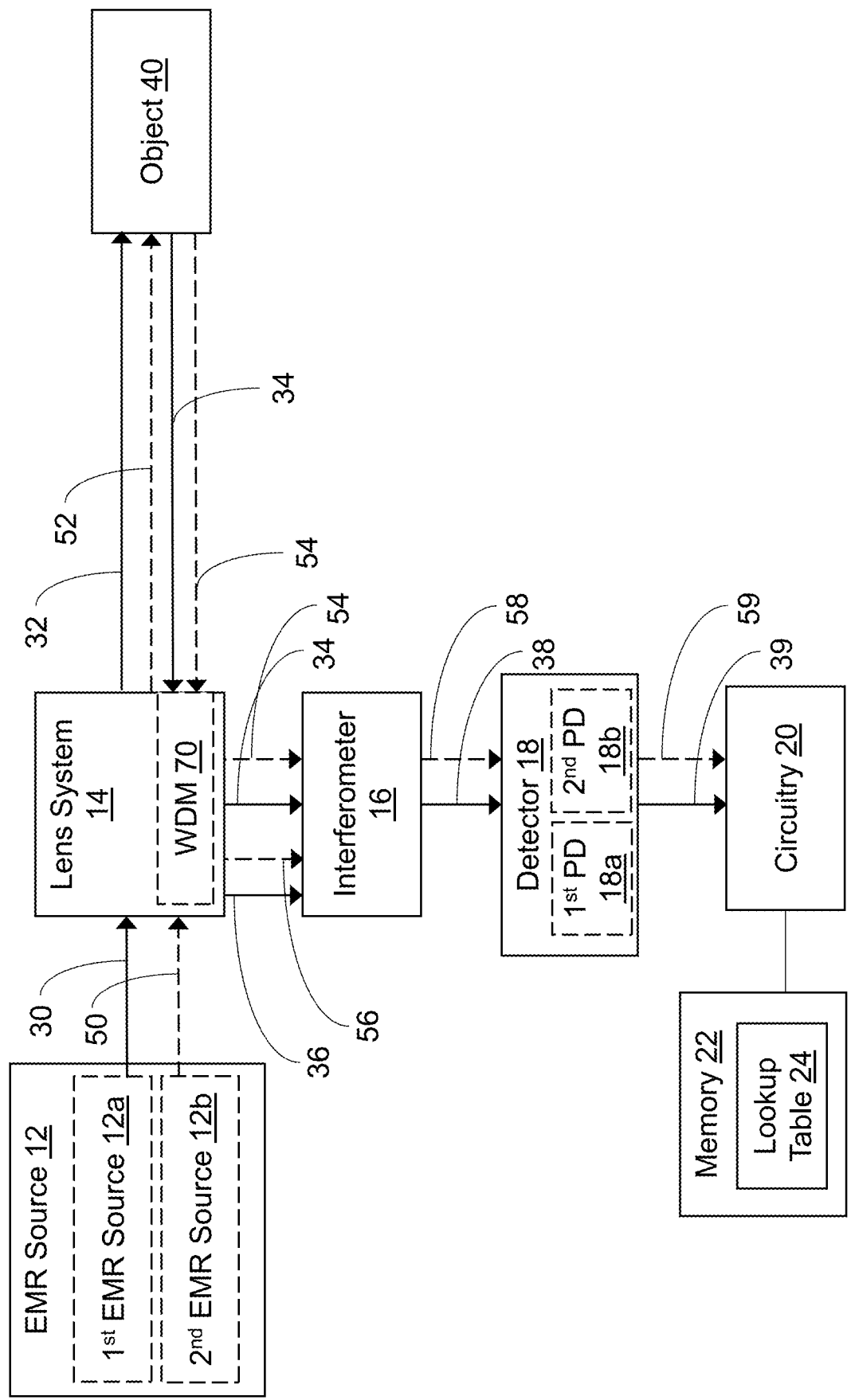
FIG. 2 is a block diagram of an optical device for performing measurements at a distance.

Turning to FIG. 2, an optical device 10 for performing reflectivity measurements at a distance is shown. The optical device 10 includes an electromagnetic radiation source 12, a lens system 14, an interferometer 16, and a photodetector 18. The electromagnetic radiation source 12 generates a first sweep 30 in time of electromagnetic radiation. The lens system 14 emits a portion 32 of the first sweep 30 to interact with an object 40 and receives a reflected portion 34 of the emitted first sweep 32 that was reflected by the object 40. The interferometer 16 combines through interference the received reflected portion 34 of the first sweep 30 with a reference portion 36 of the first sweep 30. The photodetector 18 detects the combined electromagnetic radiation 38 of the first sweep 30 and outputs a signal 39 based on the detected combined electromagnetic radiation 38.

As described above, the electromagnetic radiation source 12 is configured to generate the first sweep 30 in time of electromagnetic radiation within a first range of wavelengths 42. The first sweep 30 includes multiple different wavelengths 44 of electromagnetic radiation emitted at different times. For example, the first sweep 30 may comprise a series of wavelengths that increase or decrease with time. Alternatively, the wavelengths of the first sweep 30 may not increase or decrease with time.

As is described in further detail below, using the technique of FMCW (Frequency Modulated Continuous Wave) LiDAR, small reflections of light returning from the object 40 may be detected by sweeping the optical frequency (or wavelength) of electromagnetic radiation emitted from the electromagnetic radiation source 12.

Figure 4:
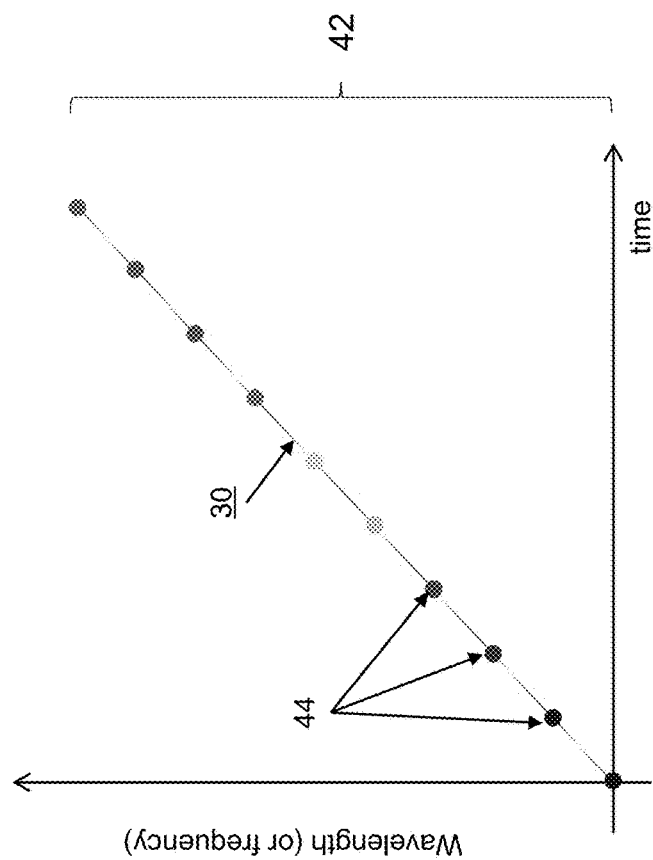
FIG. 4 is a plot showing a waveform having a plurality of output states.
Figure 3:
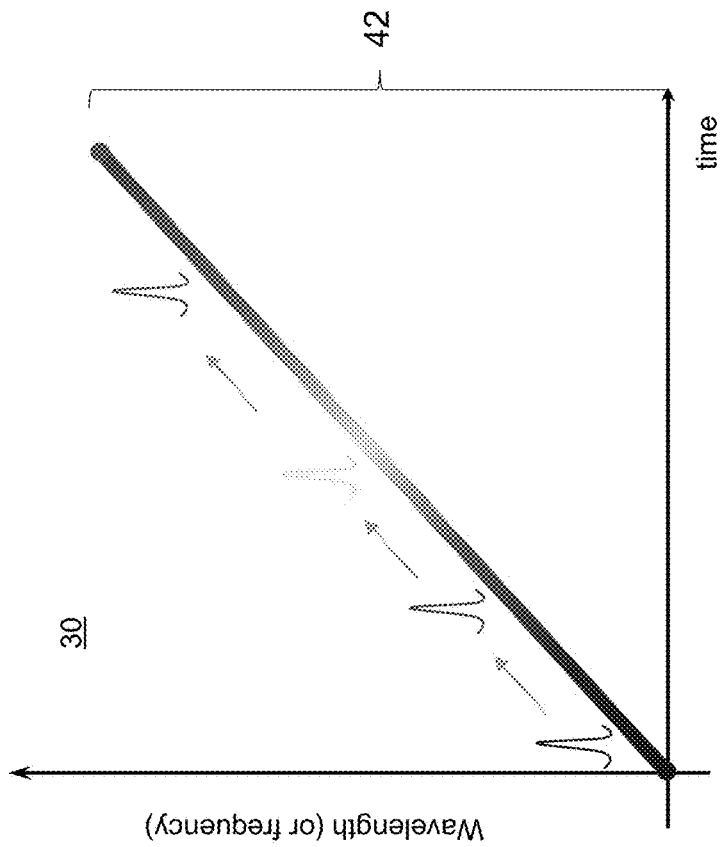
FIG. 3 is a plot showing an exemplary waveform comprising a linear wavelength sweep.

FIG. 3 shows an exemplary first sweep 30 comprising a standard 'linear sweep' (also referred to as a 'linear chirp' or 'linear frequency modulation') in which the electromagnetic radiation source is emitting radiation in a continuous chirp of optical frequencies. FIG. 4 shows an exemplary first sweep 30 comprising a waveform including a plurality (discrete set) of output states 44. The electromagnetic radiation source 12 outputs electromagnetic radiation having a particular wavelength during the output states 44. Each of the plurality of output states 44 may be separated in time from neighboring output states of the plurality of output states 44 by a time span. As a particular example, the first sweep 30 may be a discrete linear sweep, in which the output states 44 may be separated by an equal optical frequency or wavelength interval with a constant separation in time. At least two of the plurality of output states of the waveform may be separated by a particular time span of less than 1 microsecond. Each output state 44 may also have a particular wavelength, power, and coherence.

As shown in FIG. 4, the output states (also referred to as frequency steps) 44 may be evenly spaced. A duration of each output state may be in the range from 0.1 nanosecond to 1 microsecond.

During the time span separating each of the plurality of states 44 in the waveform, the electromagnetic radiation source 12 may or may not emit electromagnetic radiation. That is, the amplitude of light emitted by the electromagnetic radiation source 12 may be reduced to at least 10-100 times less than the amplitude of light emitted during the output states 44. For example, the amplitude of electromagnetic radiation (also referred to as light) in between the output states 44 may be at least 10 dB less than an amplitude of the electromagnetic radiation emitted during the output states. Or, the amplitude of the light between output points may be held constant. Or, the amplitude of the light between output points may be shaped in some fashion (such as with a periodic modulation in the amplitude versus time, for the purpose of enhancing measurement sensitivity of the detected return light from an object 40). Alternatively, as shown in FIG. 3, the electromagnetic radiation source 12 may emit electromagnetic radiation constantly throughout the sweep 30.

Figure 6:
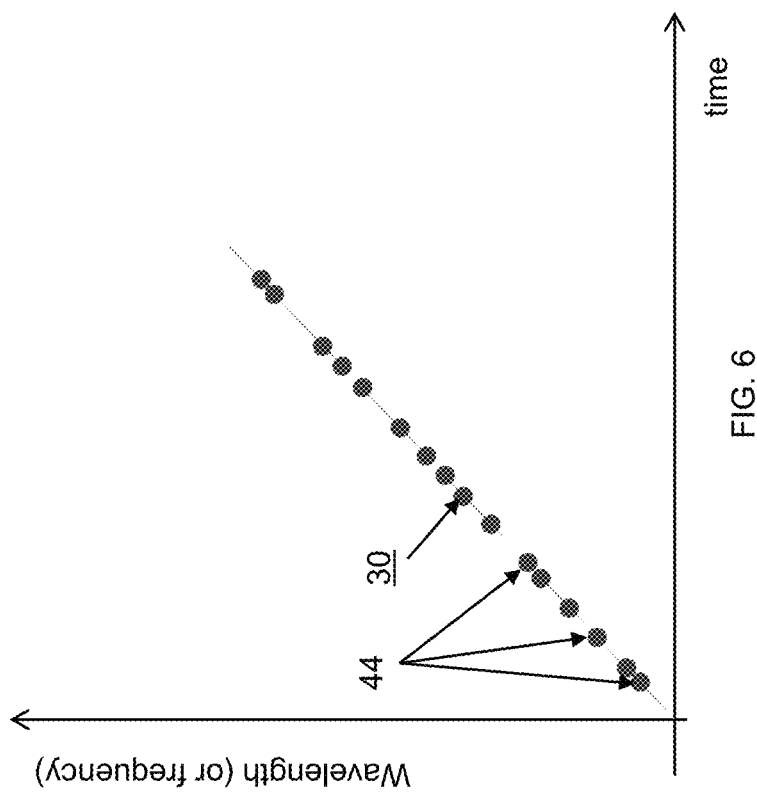
FIG. 6 shows another exemplary waveform where the output states are separated by different time spans.
Figure 5:
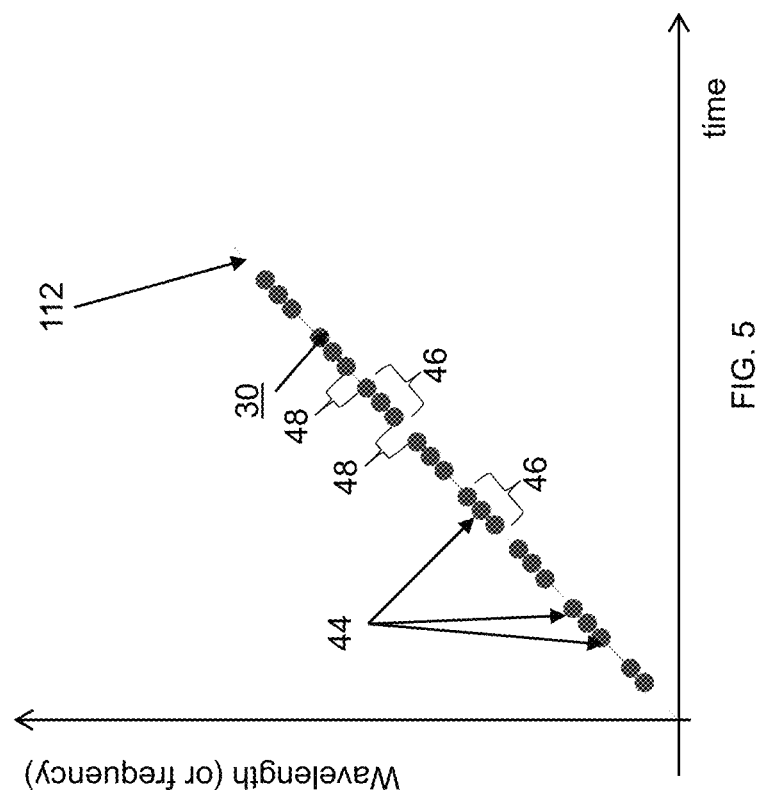
FIG. 5 shows another exemplary waveform including groupings of output states.

With continued reference to FIG. 4, a same time span may separate each of the neighboring output states 44 of the waveform. Alternatively, as shown in FIGS. 5 and 6, the time separating output states 44 in the waveform may vary. That is, a first time span separating a first two output states may be different from a second time span separating a second two output states.

FIG. 5 shows a sweep 30 having output states 44 that occur in bursts 46, separated by gaps in time 48, rather than the even frequency spacing of FIG. 4. That is, the plurality of output states 44 may be grouped into a plurality of output groups 46. Each of the plurality of output states 44 may be a member of an output group 46. Each member of each output group 46 may be separated from neighboring members of the output group by an intragroup time span. Each output group of the plurality of output groups may be separated from neighboring output groups of the plurality of output groups by an extragroup time span. The extragroup time span may be longer than the intragroup time span. As will be understood by one of ordinary skill in the art, the laser source 12 may or may not output electromagnetic radiation during the gaps in time 48.

FIG. 6 shows yet another scenario where the output states (also referred to as digital frequency steps) occur at random intervals in time, rather than evenly spaced intervals in time.

Turning to FIG. 7, the electromagnetic radiation source 12 may be further configured to generate a second sweep 50 in time of electromagnetic radiation within a second range of wavelengths. The second sweep 50 comprises multiple different wavelengths of electromagnetic radiation emitted at different times.

As will be understood by one of ordinary skill in the art, the above description regarding the first sweep 30 may similarly apply to the second sweep 50. For example, the second sweep 50 may comprise a waveform including a plurality (discrete set) of output states 44. The electromagnetic radiation source 12 may output electromagnetic radiation having a particular wavelength during the output states 44.

The present invention is not limited to two sweeps 30, 50, but may utilize any number of sweeps. The wavelength ranges of each of the sweeps 30, 50 may be chosen depending on particular wavelengths of interest. Wavelengths of interest may be determined based on the matter that is to be detected. For example, if an embodiment is intended to differentiate between water, ice, and concrete, the wavelength ranges of the sweeps (and the number of sweeps) may be chosen based on the reflectance of water, ice, and concrete at different wavelengths (see, e.g., FIG. 1). That is, the wavelength ranges may be chosen to be those ranges that, when a ratio of the reflectance is determined, can be used to effectively differentiate between water, ice, and concrete. Additionally, the sweeps 30, 50 may be repeated (e.g., to collect information for different locations in an environment).

With continued reference to FIG. 7, two sweeps 30, 50 are shown. The output states 44 of the first sweep 30 are shown as occurring sequentially before the output states 44 of the second sweep 50. However, the output states 44 of the first sweep 30 may be intermixed with the output states of the second sweep 50 such that the first sweep 30 and second sweep 50 are intermixed in time. Additionally, the first sweep 30 and second sweep 50 are shown as occurring over a mutually independent wavelength ranges. But, as shown in FIG. 8, the wavelength range of the first sweep 30 may partially (or completely) overlap with the wavelength range of the second sweep 50.

Similarly, in FIG. 7 the second sweep 50 is depicted as occurring immediately following the first sweep 30. As shown in FIG. 8, there may be a time gap ($t_{gap}$) between the first sweep 30 and the second sweep 50.

Turning to FIG. 9, the amplitude of the electromagnetic radiation being emitted by the laser source 12 may be modulated. For example, each output state 44 of the sweeps 30, 50 may have an equal amplitude. Alternatively, each output state 44 of a particular sweep 30, 50 may have an amplitude and at least two of the output states 44 of the particular sweep 30, 50 may have a different amplitude. For example, the amplitude of each output state may be configured such that a power vs. time profile of the waveform has a desired profile. The desired profile may be a Gaussian, raised cosine, and/or any other known windowing function used for digital signal processing. For example, the desired profile may create a windowing function over the time-domain waveform that expedites signal processing and enhances sensitivity to achieve the range or velocity to a target. As another example, the amplitude may be modulated periodically in time; or modulated with a period that changes with time as with a chirp; or encoded with a particular sequence of modulation amplitudes and frequencies. One exemplary objective of the amplitude modulation methods is to enhance the sensitivity of detection of the light returned from object 40.

The electromagnetic radiation source 12 may include a first electromagnetic radiation source 12a and a second electromagnetic radiation source 12b. The first sweep 30 may be generated by the first electromagnetic radiation source 12a. Similarly, the second sweep 50 may be generated by the second electromagnetic radiation source 12b.

The first range of wavelengths 60 of the first sweep 30 may be greater than one nanometer (nm) separate from the second range of wavelengths 62 of the second sweep 50. For example, the first range of wavelengths 60 may be greater than ten nanometers or more than one hundred nanometers separate from the second range of wavelengths 62. In another example, the first range of wavelengths 60 may include the wavelength of 1310 nanometers and the second range of wavelengths may include the wavelength of 1550 nanometers.

Turning back to FIGS. 7 and 8, the emitted portion of the first sweep 32 is emitted during a first time duration 64 and the emitted portion of the second sweep 52 is emitted during a second time duration 66. As shown in FIG. 7, the first time duration 64 and the second time duration 66 may overlap such that a portion of the first sweep 30 is emitted simultaneously with a portion of the second sweep 50.

The electromagnetic radiation source 12 may comprise a monolithically-constructed semiconductor laser or non-semiconductor monolithic laser in general. Monolithically-constructed semiconductor lasers or non-semiconductor monolithic lasers in general are a class of single-mode laser for producing swept wavelengths appropriate for Digital Coherent LiDAR, and can further be designed to enable high-speed wavelength tuning. Monolithic semiconductor lasers include several sections or segments in the semiconductor, which serve, for example, as adjustable cavity mirrors, laser gain, coupled cavities, cavity phase and (optionally) external amplification. Examples are fast-tuning DFB or DBR lasers, Vertical Cavity Surface Emitting Lasers (VCSELs), VCSELs with Micro-electromechanical systems (MEMS) tuning structures, Vernier-tuned Distributed Bragg Reflector (VT-DBR) lasers, Vernier-tuned ring lasers, Y-branch lasers, coupled cavity lasers, discrete mode lasers, injection-locked or externally-stabilized lasers, Super-Structure Grating Distributed Bragg Reflector (SSGDBR) lasers and similar devices. Because these lasers are typically monolithic with no moving parts (excepting the MEMs devices), their cavities and associated optics are extremely stable and can operate in single-longitudinal mode with narrow linewidth and long coherence length. Tunable monolithic lasers of this class may utilize multiple control signals to tune the wavelength, presenting a challenge to creating wavelength sweeps without wavelength discontinuities. In such lasers, a key enabler of control and programmability may be recent inventions enabling precise control of laser wavelength and power tuning profiles versus time with high SMSR and multivariate control spaces such as U.S. Pat. Nos. 9,455,549 and 9,595,804.

The electromagnetic radiation source 12 may also comprise a programmable laser. The programmable laser may comprise a laser source and circuitry. As will be understood by one of ordinary skill in the art, the laser source may comprise one or more lasers. In a preferred embodiment, the laser(s) should be appropriately designed or modified to enable the ability to wavelength-tune in a time scale of approximately 1 microsecond or less (e.g., enabling operation for targets located at ranges of approximately 200 meters or less). The laser source(s) may be a semiconductor laser, e.g., a monolithic semiconductor laser, DFB laser, DBR laser, a Vernier-tuned distributed Bragg reflector (VT-DBR) laser, MEMS-tunable semiconductor laser, Vertical Cavity Surface Emitting Laser (VCSEL), VCSEL with Micro-electromechanical systems (MEMS) tuning structures, Vernier-tuned ring laser, Y-branch laser, coupled cavity laser, discrete mode laser, injection-locked or externally-stabilized laser, Super-Structure Grating Distributed Bragg Reflector (SSGDBR) laser, Quantum Cascade Lasers and Intersubband Cascade Laser DFBs, or any other suitable type.

As described above, the lens system 14 is configured to emit a portion 32 of the first sweep 30 to interact with the object 40. The lens system 14 may include a splitter (e.g., a 1×2 splitter) configured (#1) to receive the first sweep 30 generated by the electromagnetic radiation source 12, (#2) to emit a portion 32 of the first sweep 30, and (#3) to direct the reference portion 36 of the first sweep 30 to the interferometer 16.

The lens system 14 is also configured to receive a reflected portion 34 of the emitted first sweep 32 that was reflected by the object 40. The lens system 14 may include a splitter (e.g., a 2×1 splitter) configured (#1) to receive the emitted portion 32 of the first sweep 30, (#2) to emit the emitted portion 32 of the first sweep 30, and (#3) to receive the reflected portion 34 of the emitted first sweep 32. The lens system may also include one or more lenses configured to focus the emitted portion 32 of the first sweep 30 onto the object 40.

The lens system 14 may be further configured to emit a portion 52 of the second sweep 50 to interact with the object 40 and to receive a reflected portion 54 of the emitted second sweep 52 that was reflected by the object 40. For example, the lens system 14 may include a wavelength demultiplexer 70 configured to perform wavelength demultiplexing of the reflected portion of the first sweep 34 and the reflected portion of the second sweep 54 that is received by the lens system 14.

As will be understood by one of ordinary skill in the art, the lens system 14 may include any combination of lenses, light guides, splitters, demultiplexers, and other optical components necessary to perform the manipulations of electromagnetic radiation described herein. Additionally, the lens system 14 may additionally include hardware for scanning the emitted electromagnetic radiation 32. The lens system 14 may also include a spectral band filter positioned to filter the received reflected portion 36, 56.

As described above, the interferometer 16 is configured to combine through interference the received reflected portion 34 of the first sweep 30 with a reference portion 36 of the first sweep 30. In this way, the reflected signal 34 from the target 40 may be mixed (through optical interference) with a portion of the original beam 36, which serves as a local oscillator and remains optically coherent with the reflected beam 34. The resulting signal 34 is measured and consists of (#1) the interferometric signal due to the reflection from the target and (#2) a common mode signal due to background light and due to the local oscillator. The background signal is unrelated to the reflected signal of the target and may be eliminated by balanced photodetection.

The interferometer 16 may be further configured to combine through interference the received reflected portion 54 of the second sweep with a reference portion 56 of the second sweep 50.

The interferometer 16 may comprise a splitter (e.g., a 2×2 splitter) configured to (1) receive and combine the reference portion 36, 56 and the received reflected portion 34, 54 and (2) to output the combined signal 38, 58.

The interferometer 16 may be coupled to the electromagnetic radiation source 12 (directly or indirectly) and the lens system 14 via a coupler. The interferometer 16 may comprise any type of interferometer capable of interferometrically combining electromagnetic radiation. Exemplary interferometers include, for example: a Mach-Zehnder interferometer, a Michelson interferometer, a Fabry-Perot interferometer, etc.

The photodetector 18 detects the combined electromagnetic radiation of the first sweep 38 output by the interferometer 16 and outputs a signal 39 based on the detected combined electromagnetic radiation 38. The multiple different wavelengths of the first sweep 30 are emitted sequentially in time, such that the multiple different wavelengths of the emitted portion of the first sweep 34 are detected at different times by the photodetector 18.

The combined electromagnetic radiation 38 received by the photodetector 18 includes a positive signal from the returning portion (e.g., the reflection) of the first sweep 30 that interacted with the object 40 and a noise signal. The noise signal is caused by common mode noise and common mode signal. The common-mode noise is present in both the emitted portion of the first sweep 32 and the reference portion of the first sweep 36. The common-mode signal is received with the reflected portion of the first sweep 34.

The common-mode signal may be caused by sunlight or light emitted from another source that is received along with the received reflected light 34, 54. The common-mode signal is incoherent with the electromagnetic radiation emitted by the electromagnetic radiation source 12 and may be cancelled-out by the interferometer 16 and detector 18.

For example, the photodetector 18 may comprise a balanced photodetector and may be configured to remove the noise signal from the combined electromagnetic radiation 38 using balanced photodetection. To perform balanced photodetection, the photodetector 18 may include a first photodetector 18a and a second photodetector 18b electrically connected such that a photocurrent of the first photodetector 18a cancels out a photocurrent of the second photodetector

18b. Removing the noise signal from the combined electromagnetic radiation 36 using balanced photodetection includes receiving the reflected portion of the first sweep 34 by the first photodetector 18a and the second photodetector 18b, such that: (1) the common-mode noise and the common mode signal is removed from the combined electromagnetic radiation of the first sweep and (2) an imbalance between the reflected portion of the first sweep 34 detected by the first photodetector 18a and the reflected portion of the first sweep 34 detected by the second photodetector 18b is amplified and in the outputted first signal 39.

Balanced photodetection increases signal-to-noise of the detected signal and has many advantages over simply amplifying a signal (either with an amplifier following the photodiode, or with an avalanche photodiode (APD)). Balanced photodetection is particularly useful to cancel laser noise or "common mode noise", allowing the detection of small signal fluctuations on a large DC signal.

Using balanced photodetection, common-mode noise that is present in both the reference signal 36 and the signal beam 34 (such as laser intensity noise) is cancelled out and therefore does not appear as part of the signal 39 output by the photodetector 18. On the other hand, any coherent signal generated by the interference of the reference 36 and signal beams 34, and output from the interferometer 16 (e.g., optical mixer or 2×2 coupler) is 180 degrees out of phase, causing the photocurrents generated by the photodetector 18 to be 180 degrees out of phase. Upon subtraction in the balanced detector, the photocurrent of the coherent signal is increased (typically doubled) and is seen as the received signal.

For example, balanced detection may be performed using a photodetector 18 including two photodiodes connected such that their photocurrents cancel. In this example, the DC optical power impinging upon each photodiode may, e.g., be equalized by using a variable neutral density filter. When this is done, the effective output of the balanced pair of photodiodes (i.e., the photodetector 18) is zero until there is some difference in the intensity of one of the beams. When this occurs, it causes the pair of photodiodes of the photodetector 18 to become "unbalanced" and a net signal appears in the output signal 39.

Balancing the intensities of the two beams (i.e., the reference signal 36 and the received reflected signal of the first signal 34) may be performed manually or using automated methods. For example, an auto-balancing circuit may be used. The auto-balancing circuits may use a low-frequency feedback loop to maintain automatic DC balance between the signal and reference arms of the interferometer 16.

New Focus provides five types of balanced photoreceivers. The patented Nirvana™ auto-balanced photoreceivers (Model. 2007 an. 2017) enable reduction of common-mode laser noise by more than 50 dB at frequencies from DC to 125 kHz in either simple balanced mode, or by utilizing the auto-balancing circuit. The high-speed balanced detectors (Models 16×7 and 18×7) enable balanced detection at 80 to 800 MHz bandwidths. Three low-frequency photocurrent outputs and one high-frequency RF output are provided for monitor purposes. The 10 MHz (Models 21×7) and large-area (Models 23×7) balanced receivers offer high gain and are suitable for coherent heterodyne detection applications. All three types of balanced receivers have matched, amplified photodiodes.

A preferred embodiment is to perform the balanced subtraction in the analog signal domain as a photocurrent prior to any amplification. This is preferable as it provides the best scenario for preventing saturation of the input amplifier. However, other embodiments may perform the subtraction after the photocurrents are amplified or after the photocurrents are digitized.

The photodetector 18 may be further configured to detect the combined electromagnetic radiation 58 of the second sweep 50 and output a second signal 59 based on the detected combined electromagnetic radiation 58. As will be understood by one of ordinary skill in the art, the above description regarding balanced photodetection of the first signal 30 may also apply to the second signal 50. Additionally, as described above, the photodetector 18 may be configured to detect any number of sweeps.

As will be understood by one of ordinary skill in the art, the photodetector 18 may comprise any suitable sensor for converting electromagnetic radiation (i.e., an optical signal) into an electric signal. For example, the photodetector 18 may be one or more P-I-N photodiodes made from materials such as InGaAs, Si, or Ge.

The optical device 10 may further include circuitry 20 configured to determine a reflectivity of the object 40 based on a ratio of the first signal 39 and the second signal 59. A signal 39, 59 reflected from the object 40 depends on a wavelength of incident electromagnetic radiation 32, 52. The received reflected portion of the first signal ("first reflected signal") 34 and the received reflected portion of the second signal ("second reflected signal") 54 will consist of electromagnetic radiation reflected from the surface of the object 40 as well as light scattered from thin layers of material at or near the surface of the object 40. The electromagnetic radiation reflected by the surface of the object 40 and/or the electromagnetic radiation scattered by the near-surface material of the object 40 makes up a spectral signature for the object 40 depending on the material located at or near the surface of the object 40. Consequently, both the first reflected signal 34 and the second reflected signal 54 include information regarding the composition of the object 40.

As will be understood by one of ordinary skill in the art, the circuitry may have various implementations. For example, the circuitry may include a processor or any other suitable device, such as a programmable circuit, integrated circuit, memory and I/O circuits, an application specific integrated circuit, microcontroller, complex programmable logic device, other programmable circuits, or the like. The circuitry may also include a non-transitory computer readable medium, such as random-access memory (RAM), a read-only memory (ROM), an erasable programmable read-only memory (EPROM or Flash memory), or any other suitable medium. Instructions for performing the actions and steps described below may be stored in the non-transitory computer readable medium and executed by the circuitry.

The optical device 10 may further comprise a non-transitory computer readable medium (memory) 22 storing a lookup table 24. The lookup table 24 links reflectivity, a first range of wavelengths, and a second range of wavelengths to different compositions. The circuitry 20 is further configured to determine a composition of the object using the lookup table 24. For example, the lookup table may specify for a given first range of wavelengths and a given second range of wavelengths, a list of ratio ranges and an associated composition.

As will be understood by one of ordinary skill in the art, the non-transitory computer readable medium (memory) 22 may be, for example, one or more of a buffer, a flash memory, a hard drive, a removable media, a volatile memory, a non-volatile memory, a random access memory (RAM), or other suitable device. In a typical arrangement, the computer readable medium 22 may include a non-volatile memory for long term data storage and a volatile memory that functions as system memory for the circuitry 20. The computer readable medium 22 may exchange data with the circuitry 20 over a data bus. Accompanying control lines and an address bus between the computer readable medium 22 and the circuitry 20 also may be present. The computer readable medium 22 is considered a non-transitory computer readable medium.

The circuitry 20 may additionally be configured to receive the outputted first signal 39 and enhance the signal-to-noise ratio of the outputted first signal 39 by processing the outputted first signal 39 with a Fast Fourier Transform (FFT). The circuitry 20 may be configured to process the first signal 39 using the FFT by processing with the FFT the first signal 39 over a duration (e.g., greater than 50% of the duration, greater than 75% of the duration, greater than 90% of the duration, or the entire duration) of the first sweep 30.

The FFT is a specific signal processing approach to spectral estimation that allows the use of all of the photons collected over the sweep time to improve the SNR of the reflectivity and it's distance (also referred to as processing gain). As will be understood by one of ordinary skill in the art, there are other signal processing methods that allow the reflectivity to be extracted with similar SNR benefits. For example, there are different classes of these methods that fall under the term spectral estimation; a specific class is called APES (amplitude and phase estimation). A number of these techniques are pioneered in RADAR fields, such as Sparse Aperture Radar (SAR). Alternate processing techniques also recognize the gaps in the wavelength bands, using techniques called GAPES (gapped APES) to further enhance the SNR.

Consequently, the circuitry 20 may alternatively be configured to receive the outputted first signal 39 and enhance the signal-to-noise ratio of the outputted first signal 39 by processing the outputted first signal 39 over a duration of the first sweep. For example, the circuitry 20 may be configured to process the first signal 39 over greater than 50% of the duration, greater than 75% of the duration, greater than 90% of the duration, or the entire duration of the first sweep 30.

The sensitivity of the optical device 10 arises from two effects: coherent gain and processing gain. Coherent gain comes from mixing the weak return signal 34, 54 from a target or sample with a local, strong time-delayed version of the transmitted beam. Processing gain comes from processing the signal with an FFT (or other spectral estimation method) that enhances the signal to noise ratio by processing the signal over the entire sweep duration (which may be 100's of nanoseconds to 10's of microseconds, depending on the distance to the target, as the sweep time may be comparable to the round-trip time-of-flight to a target) and is typically much longer than the nanosecond pulse widths used in time-of-flight pulses used in some ranging methods. The enhancement in the signal-to-noise ratio may be understood in several ways. The longer measurement time effectively narrows the measurement bandwidth, which reduces the noise, while also essentially integrating the number of photons that provide information about the signal. An alternative, heuristic perspective is that the FFT estimates the amplitude of the signal more accurately with each additional interference fringe in the time-domain signal that is processed by the FFT. With more fringes, over a longer time, the FFT can more accurately calculate the amplitude and frequency of the sinusoidal components in the interferometer signal.

As will be understood by one of ordinary skill in the art, the FFT is merely one of several possible ways of performing spectral estimation allowing use of the signal over the entire sweep. For example, the following additional techniques may also be applied: amplitude and phase estimation (APES), gapped data APES (GAPES), signal processing from Sparse Aperture Radar, maximum entropy method, algebraic reconsruction, and autoregressive spectral estimation.

In one embodiment, the electromagnetic radiation source 12 may sweep two or more narrow spectral regions (1-10 GHz) that may be >=1 nm apart using the first and second sweep 30, 50. In the case of a very widely tunable electromagnetic radiation source 12, the narrow spectral regions may be tens of nm's apart or even over 200 nm apart. In one such example, the electromagnetic radiation source 12 may sweep a narrow region at 1310 nm and another narrow region at 1550 nm. The interferometric signals measured for these narrow sweeps are practical to measure. For instance, a 5 GHz sweep at 1550 nm, performed at a repetition rate of 100 kHz (10 μsec sweep time) creates an interferometric signal of 67 MHz that is readily measurable. The expression governing the interferometric signal frequency for a linearly swept optical frequency vs time is well-known to those skilled in the art of swept-wavelength interferometry and is given by $f\_signal=(2R/c)*\Delta v*\gamma$, where R is the range to the object, c is the speed of light, $\Delta v$ is the optical frequency range swept by the electromagnetic radiation source and $\gamma$ is the linear sweep rate.

Within the wavelength region of each narrow sweep, the reflectivity of the object 40 (also referred to as a target) may be determined. When the electromagnetic radiation source 12 includes only a single laser source, the electromagnetic radiation source 12 may sweep the two or more wavelength regions (i.e., the two or more sweeps 30, 50) sequentially and repeatably in time (time-multiplexing the sweeps), allowing for the detection to be correspondingly time-correlated and the reflectivity data for each wavelength region to be demultiplexed after data acquisition. An FFT may be performed on the demultiplexed data.

In this embodiment, the reflectivity in each swept region gives the relative spectral response at the center-wavelength of the sweep. By comparing the square of the amplitude of the peak of the frequency component in the FFT (each frequency component representing a reflection at a particular distance from the sensor, which is proportional to reflectivity of the object 40, which is dependent on the spectroscopic response of the target), at two or more spectral regions, the identity of composition of the target 40 may be found using the ratio of the reflectivity as described above.

In another embodiment, the wavelengths in the narrow regions may be sufficiently far apart that a single laser cannot output light in the two or more regions. In this case or for other reasons, the electromagnetic radiation source 12 may include two or more laser sources. For example, the two or more laser sources may be grown on the same semiconductor laser chip, creating a photonic integrated circuit where the lasers are combined with waveguide couplers and a single output to the target is created. The couplers may be highly wavelength dependent to minimize insertion losses. An example scenario would be to use wavelength regions covered by InP (Indium Phosphide), where individual gain regions could be grown anywhere from 1250-2000 nm. If the spectroscopic regions of interest were 1310, 1550, and 1650 nm (each covered by small, e.g., 1-125 GHz sweep centered at each wavelength mentioned), then standard telecom laser gain materials and cavity structures could be employed such as DFBs (distributed feedback lasers). Another exemplary scenari would be to use QCLs (4-12 microns) or DFB lasers based on ISLs (Interband Cascade Lasers, or Intra-subbband lasers, covering 3-6 microns). Longer wavelength sources interact with the primary ro-virbational transitions in molecules and can produce very strong reflected signal (in some cases 10-1000× stronger than signals measured in the NIR regions at 1-2 um wavelengths.

Within this embodiment, the two or more lasers of the electromagnetic radiation source 12 could be swept sequentially, allowing for a time demultiplexing of the received signal to identify the two or more spectral regions. Alternatively, the two or more laser sources could be swept sequentially or concurrently, but the detection of light could be wavelength demultiplexed into two or more spectrally-specific balanced detection components that may offer better signal-to-noise. The two or more sweeps could go in the same direction (from lower to higher wavelength), or in opposite directions, or even using different sweep rates if needed.

In a related, preferred embodiment, the detection of the reflected signal may be performed on the same Photonic Integrated Circuit (PIC) that comprises the laser sources. Photodetectors may be grown directly on the same substrate as the lasers, significantly reducing the size and through wafer-scale fabrication, the cost of the overall detection system. If the system uses a monostatic approach, the output transmission and the reception of return light could use the same aperture, which potentially makes the system self-aligning and minimizes critical optical component alignments. Consequently, the electromagnetic radiation source 12, lens system 14, interferometer 16, and detector 18 may be included in a single housing.

In a third embodiment, the lasers source of the electromagnetic radiation source 12 may be independent devices that are coupled together either fiber-optically or through free space optics. Consequently, the electromagnetic radiation source 12 may not be included within a single housing. The aforementioned example of 1310, 1550 and 1650 nm wavelengths is particularly convenient because all three wavelengths are propagated in SMF-28 fiber and the wavelength multiplexing may use typical telecom fiber-optic components. Also, photodetection of all three wavelengths may be performed on a common InGaAs photodetector.

An important element of coherent detection that is part of the present invention is the ability to separate the small signal of interest from large background offsets such as can occur from sunlight. In coherent detection schemes of the present invention, balanced detection provides the mechanism for canceling substantial background offset signals. By contrast, direct detection methods (e.g., such as Avalanche Photodiode Detectors (APDs)), require amplification using a high gain and spectral filtering (spectral filtering is needed to minimize the amount of offset caused by spectrally broad light sources such as sunlight. A narrow spectral band filter, centered at the detection wavelength, can suppress the background light from the sun that could be amplified by the high gain of, e.g., an APD or Silicon APD (SPAD) and completely saturate the photo detector 18 and render it useless until the detector 18 refreshes after some recovery time.

The high gain required in direct detection methods, such as time-of-flight measurement of pulses, makes the detectors vulnerable to saturation. Further, if a large background offset is detected but the sensor is not saturated, an APD or other high gain single-ended photosensor may not have an effective means to eliminate the offset which removes both of the dc component and all of the related high frequency noises associated with a high background signal such as sunlight or spurious reflection from ambient light. Said in another way, the high offset due to background may contribute significant noise but no signal, and this can significantly degrade the sensitivity of the measurement system.

Figure 10:
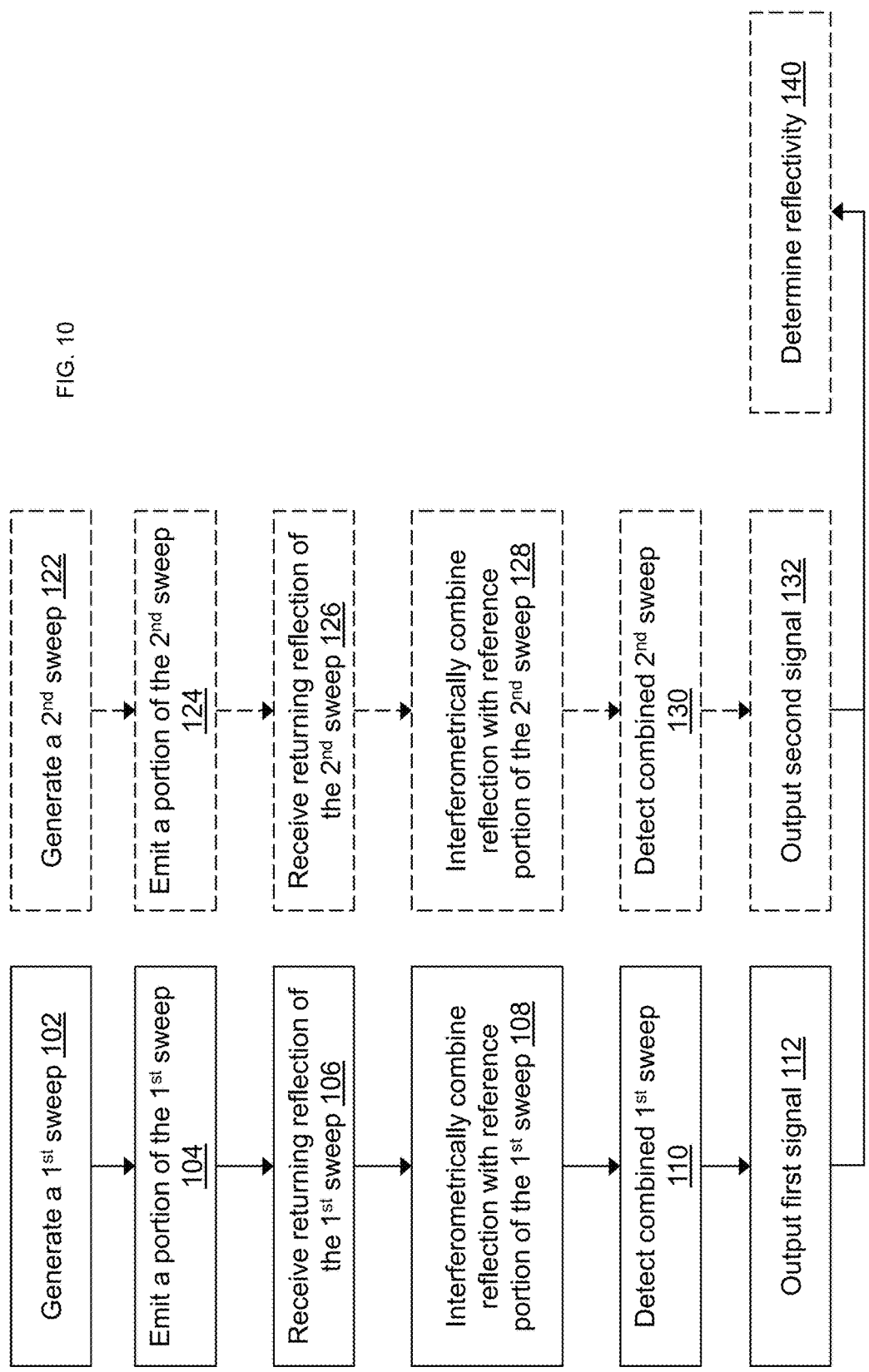
FIG. 10 is flow diagram showing a method for performing measurements at a distance.

Turning to FIG. 10, a method 100 for performing reflectivity measurements at a distance using a device 10 including an electromagnetic radiation source 12 and a photodetector 18 is shown.

In processing block 102, the electromagnetic radiation source 12 generates a first sweep 30 in time of electromagnetic radiation within a first range of wavelengths 60. In processing block 104, a portion of the electromagnetic radiation of the first sweep is emitted 32 to interact with the object 40. In processing block 106, a reflected portion of the emitted portion of the first sweep 34 that was reflected by the object 40 is received. In processing block 108, the received reflected portion of the emitted portion of the first sweep 34 is combined interferometrically with a reference portion of the first sweep 36. In processing block 110, the combined electromagnetic radiation of the first sweep 38 is detected with the photodetector 18. In processing block 112, a first signal 39 is outputted by the photodetector 18 based on the detected combined electromagnetic radiation 38.

In optional processing block 122, the electromagnetic radiation source 12 generates a second sweep 50 in time of electromagnetic radiation within a second range of wavelengths 62. In optional processing block 124, a portion of the electromagnetic radiation of the second sweep is emitted 52 to interact with the object 40. In optional processing block 126, a reflected portion of the emitted portion of the second sweep 54 that was reflected by the object 40 is received. In optional processing block 128, the received reflected portion of the emitted portion of the second sweep 54 is combined interferometrically with a reference portion of the second sweep 56. In optional processing block 130, the combined electromagnetic radiation of the second sweep 58 is detected with the photodetector 18. In optional processing block 132, a second signal 59 is outputted by the photodetector 18 based on the detected combined electromagnetic radiation 58.

In optional processing block 140, a reflectivity of the object 40 is determined by the circuitry 20 based on a ratio of the first signal 39 and the second signal 59.

As will be understood by one of ordinary skill in the art, the choice of spectral regions (i.e., wavelength ranges) is very flexible and not limited to those sources that can be grown in one semiconductor material system. For instance, it may be advantageous to measure over sweeps at 1550 nm as well as 2100 nm. This might require devices made from InP, or InGaAs, as well as GaSb (Gallium Antinomide). Making light sources from devices in different material could be achieved in many ways: bonding 2 or more chips to a common carrier and coupling through a Silicon or Silicon Nitride material; or using InP, InGaAs and GaSb grown gain materials to laser structures fashioned from Silicon waveguides or Silicon Nitride, as is commonly referred to as a hybrid laser approach for devices in the datacom field of use.

It should be appreciated that many of the elements discussed in this specification may be implemented in a hardware circuit(s), a processor executing software code or instructions which are encoded within computer readable media accessible to the processor, or a combination of a hardware circuit(s) and a processor or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a processor or control block executing code encoded in a computer readable media, or a combination of a hardware circuit(s) and a processor and/or control block executing such code.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method for performing measurements at a distance of returning electromagnetic radiation using a device including an electromagnetic radiation source and a photodetector, the method comprising:
    using the electromagnetic radiation source, generating a first sweep in time of electromagnetic radiation within a first range of wavelengths, wherein the first sweep comprises multiple different wavelengths of electromagnetic radiation emitted at different times;
    emitting a portion of the electromagnetic radiation of the first sweep to interact with an object;
    receiving a returning portion of the emitted portion of the first sweep that interacted with the object;
    combining through interference the returning portion of the emitted portion of the first sweep with a reference portion of the first sweep;
    detecting with the photodetector the combined electromagnetic radiation of the first sweep;
    outputting a first signal by the photodetector based on the detected combined electromagnetic radiation;
    using the electromagnetic radiation source, generating a second sweep in time of electromagnetic radiation within a second range of wavelengths, wherein the second sweep comprises multiple different wavelengths of electromagnetic radiation emitted at different times;
    emitting a portion of the electromagnetic radiation of the second sweep to interact with the object;
    receiving a returning portion of the emitted portion of the second sweep that interacted with the object;
    combining through interference the returning portion of the emitted portion of the second sweep with a reference portion of the second sweep;
    detecting with the photodetector the combined electromagnetic radiation of the second sweep;
    outputting a second signal by the photodetector based on the detected combined electromagnetic radiation; and
    determining using circuitry a reflectivity of the object based on a ratio of the first signal and the second signal, wherein a signal returned from the object depends on a wavelength of incident electromagnetic radiation.

2. The method of claim 1, further comprising determining using the circuitry a composition of the object using a lookup table linking reflectivity, a first range of wavelengths, and a second range of wavelengths to different compositions.

3. The method of claim 1, wherein:
    the electromagnetic radiation source comprises a first electromagnetic radiation source and a second electromagnetic radiation source;
    the first sweep is generated by the first electromagnetic radiation source;
    the second sweep is generated by the second electromagnetic radiation source;
    the emitted portion of the first sweep is emitted during a first time duration;
    the emitted portion of the second sweep is emitted during a second time duration; and
    the first time duration and the second time duration overlap such that a portion of the first sweep is emitted simultaneously with a portion of the second sweep.

4. The method of claim 3, further comprising performing wavelength demultiplexing of the returning portion of the first sweep and the returning portion of the second sweep.

5. The method of claim 1, wherein the first range of wavelengths is greater than one nanometer (nm) separate from the second range of wavelengths.

6. The method of claim 5, wherein the first range of wavelengths is greater than ten nanometers or more than one hundred nanometers separate from the second range of wavelengths.

7. The method of claim 1, wherein the first range of wavelengths includes 1310 nanometers and the second range of wavelengths includes 1550 nanometers.

8. The method of claim 1, further comprising:
    enhancing the signal-to-noise ratio of the first signal by processing the first signal with a Fast Fourier Transform (FFT).

9. The method of claim 8, wherein:
    the FFT enhances the signal-to-noise ratio of the first signal by processing with the FFT the first signal over a duration of the first sweep.

10. The method of claim 1, further comprising:
    enhancing the signal-to-noise ratio of the first signal by processing the first signal over a duration of the first sweep.

11. The method of claim 1, wherein the multiple different wavelengths of the first sweep are emitted sequentially in time, such that the multiple different wavelengths of the emitted portion of the first sweep are detected at different times by the photodetector.

12. The method of claim 1, further comprising filtering the received returning portion using a spectral band filter.

13. A method for performing measurements at a distance of returning electromagnetic radiation using a device including an electromagnetic radiation source and a photodetector, the method comprising:

using the electromagnetic radiation source, generating a first sweep in time of electromagnetic radiation within a first range of wavelengths, wherein the first sweep comprises multiple different wavelengths of electromagnetic radiation emitted at different times;

emitting a portion of the electromagnetic radiation of the first sweep to interact with an object;

receiving a returning portion of the emitted portion of the first sweep that interacted with the object;

combining through interference the returning portion of the emitted portion of the first sweep with a reference portion of the first sweep;

detecting with the photodetector the combined electromagnetic radiation of the first sweep; and outputting a first signal by the photodetector based on the detected combined electromagnetic radiation wherein the combined electromagnetic radiation includes:
a positive signal from the returning portion of the first sweep that interacted with the object; and
a noise signal caused by:
common-mode noise present in both the emitted portion of the first sweep and the reference portion of the first sweep; and
common-mode signal received with the returning portion of the first sweep; and further comprising removing the noise signal from the combined electromagnetic radiation using balanced photodetection.

14. The method of claim 13, further comprising:
using the electromagnetic radiation source, generating a second sweep in time of electromagnetic radiation within a second range of wavelengths, wherein the second sweep comprises multiple different wavelengths of electromagnetic radiation emitted at different times;

emitting a portion of the electromagnetic radiation of the second sweep to interact with the object;

receiving a returning portion of the emitted portion of the second sweep that interacted with the object;

combining through interference the returning portion of the emitted portion of the second sweep with a reference portion of the second sweep;

detecting with the photodetector the combined electromagnetic radiation of the second sweep; and outputting a second signal by the photodetector based on the detected combined electromagnetic radiation.

15. The method of claim 14, further comprising determining using circuitry a reflectivity of the object based on a ratio of the first signal and the second signal, wherein a signal returned from the object depends on a wavelength of incident electromagnetic radiation.

16. The method of claim 13, wherein:
the photodetector includes a first photodetector and a second photodetector electrically connected such that a photocurrent of the first photodetector cancels out a photocurrent of the second photodetector;

removing the noise signal from the combined electromagnetic radiation using balanced photodetection comprises receiving the returning portion of the first sweep by the first photodetector and the second photodetector, such that:
the common-mode noise and the common mode signal is removed from the combined electromagnetic radiation of the first sweep; and
an imbalance between the returning portion of the first sweep detected by the first photodetector and the returning portion of the first sweep detected by the second photodetector is amplified in the outputted first signal.

17. An optical device for performing measurements at a distance of returning electromagnetic radiation, the optical device comprising:
an electromagnetic radiation source configured to generate a first sweep in time of electromagnetic radiation within a first range of wavelengths, wherein the first sweep comprises multiple different wavelengths of electromagnetic radiation emitted at different times;
a lens system configured to:
emit a portion of the first sweep to interact with an object; and
receive a returning portion of the emitted first sweep that interacted with the object;
an interferometer configured to combine through interference the received returning portion of the first sweep with a reference portion of the first sweep; and
a photodetector configured to:
detect the combined electromagnetic radiation of the first sweep; and
output a signal based on the detected combined electromagnetic radiation;
wherein the electromagnetic radiation source is further configured to generate a second sweep in time of electromagnetic radiation within a second range of wavelengths;
wherein the second sweep comprises multiple different wavelengths of electromagnetic radiation emitted at different times;
wherein the lens system is further configured to:
emit a portion of the second sweep to interact with the object; and
receive a returning portion of the emitted second sweep that interacted with the object;
wherein the interferometer further configured to combine through interference the received returning portion of the second sweep with a reference portion of the second sweep;
the photodetector is further configured to:
detect the combined electromagnetic radiation of the second sweep; and
output a second signal based on the detected combined electromagnetic radiation
further comprising circuitry configured to determine a reflectivity of the object based on a ratio of the first signal and the second signal, wherein a signal returning from the object depends on a wavelength of incident electromagnetic radiation.

18. The device of claim 17, further comprising a non-transitory computer readable medium, wherein:
the circuitry is further configured to determine a composition of the object using a lookup table stored in the non-transitory computer readable medium; and
the lookup table links reflectivity, a first range of wavelengths, and a second range of wavelengths to different compositions.

19. The device of claim 17, wherein:
the electromagnetic radiation source comprises a first electromagnetic radiation source and a second electromagnetic radiation source;
the first sweep is generated by the first electromagnetic radiation source;
the second sweep is generated by the second electromagnetic radiation source;

the emitted portion of the first sweep is emitted during a first time duration;

the emitted portion of the second sweep is emitted during a second time duration;

the first time duration and the second time duration overlap such that a portion of the first sweep is emitted simultaneously with a portion of the second sweep.

20. The device of claim 19, further comprising a wavelength demultiplexer configured to perform wavelength demultiplexing of the returning portion of the first sweep and the returning portion of the second sweep that is received by the lens system.

21. The device of claim 17, further comprising:

circuitry configured to receive the outputted first signal and enhance the signal-to-noise ratio of the outputted first signal by processing the outputted first signal with a Fast Fourier Transform (FFT).

22. The device of claim 21, wherein the circuitry is configured to process the first signal using the FFT by processing with the FFT the first signal over a duration of the first sweep.

23. An optical device for performing measurements at a distance of returning electromagnetic radiation, the optical device comprising:

an electromagnetic radiation source configured to generate a first sweep in time of electromagnetic radiation within a first range of wavelengths, wherein the first sweep comprises multiple different wavelengths of electromagnetic radiation emitted at different times;

a lens system configured to:
  emit a portion of the first sweep to interact with an object; and
  receive a returning portion of the emitted first sweep that interacted with the object;

an interferometer configured to combine through interference the received returning portion of the first sweep with a reference portion of the first sweep, and a photodetector configured to:
  detect the combined electromagnetic radiation of the first sweep; and
  output a signal based on the detected combined electromagnetic radiation;

wherein the combined electromagnetic radiation includes:
  a positive signal from the returning portion of the first sweep that interacted with the object; and
  a noise signal caused by:
    common-mode noise present in both the emitted portion of the first sweep and the reference portion of the first sweep; and
    common-mode signal received with the returning portion of the first sweep; and wherein the photodetector comprises a balanced photodetector and is configured to remove the noise signal from the combined electromagnetic radiation using balanced photodetection.

24. The device of claim 23 wherein:

the electromagnetic radiation source is further configured to generate a second sweep in time of electromagnetic radiation within a second range of wavelengths;

the second sweep comprises multiple different wavelengths of electromagnetic radiation emitted at different times;

the lens system is further configured to:
  emit a portion of the second sweep to interact with the object;
  receive a returning portion of the emitted second sweep that interacted with the object;

the interferometer further configured to combine through interference the received returning portion of the second sweep with a reference portion of the second sweep;

the photodetector is further configured to:
  detect the combined electromagnetic radiation of the second sweep; and
  output a second signal based on the detected combined electromagnetic radiation.

25. The device of claim 24, further comprising circuitry configured to determine a reflectivity of the object based on a ratio of the first signal and the second signal, wherein a signal returning from the object depends on a wavelength of incident electromagnetic radiation.

26. The device of claim 23, wherein:

the photodetector includes a first photodetector and a second photodetector electrically connected such that a photocurrent of the first photodetector cancels out a photocurrent of the second photodetector;

removing the noise signal from the combined electromagnetic radiation using balanced photodetection comprises receiving the returning portion of the first sweep by the first photodetector and the second photodetector, such that:
  the common-mode noise and the common mode signal is removed from the combined electromagnetic radiation of the first sweep; and
  an imbalance between the returning portion of the first sweep detected by the first photodetector and the returning portion of the first sweep detected by the second photodetector is amplified and in the outputted first signal.

* * * * *